United States Patent [19]
Clawson

[11] Patent Number: 5,658,094
[45] Date of Patent: Aug. 19, 1997

[54] ENERGY RECUPERATIVE SOIL REMEDIATION SYSTEM

[75] Inventor: Lawrence G. Clawson, Dover, Mass.

[73] Assignee: Cedarapids, Inc, Cedar Rapids, Iowa

[21] Appl. No.: 583,434

[22] Filed: Jan. 5, 1996

[51] Int. Cl.⁶ .................. B09B 3/00; B09C 1/06
[52] U.S. Cl. ............. 405/128; 110/236; 110/346; 432/111; 405/131
[58] Field of Search ................. 405/128, 129, 405/131; 110/236, 246, 255, 346; 432/103, 111

[56] References Cited

U.S. PATENT DOCUMENTS

| | | | |
|---|---|---|---|
| 4,285,773 | 8/1981 | Taciuk . | |
| 4,724,777 | 2/1988 | Reed et al. | 110/246 |
| 4,878,839 | 11/1989 | Wunning | 110/211 X |
| 5,049,067 | 9/1991 | Hengelmolen | 110/215 X |
| 5,078,836 | 1/1992 | Hogan | 201/7 |
| 5,088,856 | 2/1992 | Yocum | 405/128 |
| 5,121,699 | 6/1992 | Frank | 110/246 |
| 5,164,158 | 11/1992 | Brashears et al. | 110/246 X |
| 5,170,726 | 12/1992 | Brashears et al. | 110/236 |
| 5,193,935 | 3/1993 | Musil | 405/128 |
| 5,284,016 | 2/1994 | Stark et al. | 60/303 |
| 5,297,954 | 3/1994 | Colagiovanni | 431/5 |
| 5,320,518 | 6/1994 | Stilger et al. | 431/7 |
| 5,340,236 | 8/1994 | Ikenberry | 405/128 |
| 5,350,252 | 9/1994 | Musil et al. | 405/128 |
| 5,352,115 | 10/1994 | Klobucar | 432/181 |
| 5,378,083 | 1/1995 | Swanson | 405/128 |
| 5,388,985 | 2/1995 | Musil et al. | 431/116 |
| 5,393,501 | 2/1995 | Clawson et al. | 422/187 |
| 5,425,923 | 6/1995 | Swisher, Jr. et al. | 422/188 |
| 5,499,586 | 3/1996 | Davis | 110/246 |

*Primary Examiner*—George A. Suchfield
*Attorney, Agent, or Firm*—Donald R. Schoonover

[57] ABSTRACT

An improved system for remediating soil contaminated with short-chain hydrocarbons, long-chain hydrocarbons and PCB's. The system includes an rotary drum having first and second heat exchanging regions, each containing separated inner and outer regions. The drum in inclined such that soil fed into the system with a sealed auger for remediation is gravitationally urged through the inner regions whereat thermal energy provided by a burner means, including clamshell ducts, remediates the soil by vaporizing and oxidizing the hydrocarbons and PCB's in a stream of hot gases. After remediation, the soil and the stream of hot gases is transferred to the outer regions whereat the soil is auger-conveyed and fluid-flow urged therethrough, in counter-flow relation to the gravitationally urged soil in the inner regions, to transfer thermal energy from the remediated soil and stream of hot gases to the soil being remediated, to reduce the temperature of the remediated soil and the stream of hot gases prior to discharge, and to discharge the remediated soil and the stream of hot gases. An improved method is similarly provided.

23 Claims, 4 Drawing Sheets

ENERGY RECUPERATIVE SOIL REMEDIATION SYSTEM

BACKGROUND OF THE INVENTION

1. Field of the Invention

The present invention relates generally to soil remediation equipment and, particularly, without limitation, to such equipment utilizing a combustion chamber in a rotating drum.

2. Description of the Related Art

Remediation of contaminated soil is, and will continue to be for the foreseeable future, a large and growing industry. For example, soil containing hydrocarbons due to service station ground leakage must be cleaned or removed before the property can be transferred. Companies that have developed equipment and experience for similar applications, such as asphalt plant plants, are a natural for providing the skills and facilities needed for soil remediation.

The generally applied method of remediating contaminated soil is to heat the soil with a large combustion heater to a sufficiently elevated temperature, such as approximately 500° F., in an inclined rotating drum, that gravitationally flows the soil continuously therethrough. The elevated temperature releases the contaminants—typically hydrocarbons, both short chain and long chain—from the soil by vaporization. The soil is then removed from the rotating drum and cooled for reuse.

The vapors, containing the contaminants and combustion products from the burner used to elevate the soil temperature, are usually directed, after filtering, into an afterburner. The afterburner generally comprises a second large burner that, in conjunction with the combustion properties of the contaminates, further elevate the temperature of the vapors in order to break down and oxidize contaminates remaining in the vapors. Short-chain or light hydrocarbons, such as those arising from service station leakage, vaporize at approximately 500° F. and require afterburning at approximately 1600° F.; long-chain or heavy hydrocarbons, such as those arising from coal gasification production, vaporize at approximately 1000° F. and require afterburning at approximately 2,000° F. The afterburned vapor, which is relatively clean, is cooled and/or filtered and exhausted into the atmosphere. Typically, such a described soil remediation system can treat 25 to 50 tons of contaminated soil per hour.

Similarly to long-chain hydrocarbon clean-up, clean-up of PCB contamination is more energy intensive than short-chain hydrocarbon cleanup.

One attempt to reduce energy consumption during soil remediation is disclosed in U.S. Pat. No. 5,170,726 wherein heat staging of soil contaminated with short-chain and long-chain hydrocarbons was utilized in an attempt to reduce the afterburning temperature to 1600° F. Unfortunately, however, the system was more complex in that not one, but two, drums were required. Soil is heated by a first large burner to approximately 500° F. in a first drum followed by cascading the heated soil into a second drum with a second large burner to further elevate the temperature of the soil and vapor to approximately 1000° F. The vapors containing long-chain hydrocarbons that were released at the 1000° F. of the high-temperature drum were then vented through the first large burner of the low-temperature drum to simultaneously afterburn the long-chain hydrocarbons during the first-stage heating of the contaminated soil in the first drum. Thus, in theory, the only hydrocarbons entering a separate afterburner were the short-chain hydrocarbons that were vaporized in the first drum. Unfortunately, energy consumption, although reduced, is still excessive.

What is needed is a soil remediation system that vaporizes and afterburns the volatilized contaminates—including short-chain hydrocarbons, long-chain hydrocarbons, and PCB's—with a single drum and a single burner to thereby substantially reduce energy consumption even further and to exhaust clean soil and clean vapor at a temperature of approximately 450° F.

SUMMARY OF THE INVENTION

An improved soil remediation system is provided for reducing energy consumption during use thereof to remediate contaminated soil containing short-chain hydrocarbons, long-chain hydrocarbons and/or PCB's. Briefly, the improved system comprises a single heat source; a single drum; recovery of thermal energy from hot, remediated soil; and recovery of thermal energy from the hot gas stream of oxidized contaminate vapors to thereby conserve energy.

The improved system includes a cylindrically shaped rotary drum having an outer shell with a first end and a second end, and first and second heat transferring regions. The rotary drum is inclined such that the first end is elevated relative to the second end.

The first heat transferring region includes a first heat transferring zone spaced internally within the outer shell and extending from the first end and terminating intermediately between the first end and the second end. The second heat transferring region includes a second heat transferring zone spaced internally within the outer shell and extending from the first heat transferring zone to the second end. An inner shell, spaced radially inwardly from the outer shell and generally co-extensive with the first heat transferring zone, has a tumbling region contained internally therein and forms an annular region between it and the outer shell.

A burner shell, spaced radially inwardly from the outer shell and being generally co-extensive with the second heat transferring zone, has a combustion chamber internally therein. An intermediate shell, spaced radially between the outer shell and the burner shell, forms an outer annular region between it and the outer shell and forms an inner annular region between it and the burner shell. The intermediate shell is connected to the inner shell such that contaminated soil is gravitationally urged from the inner shell into the intermediate shell. Spacers, that locate the inner shell and the intermediate shell relative to the outer shell, have an auger-like configuration to operatively urge remediated soil through the outer annular region and the annular region from the second end to the first end in counter-flow relation to the contaminated soil being gravitationally urged from the first end to the second end through the first and second heat exchanging zones. A transition component is connected to the second end such that a transition cavity is formed therein; the transition component has a generally conical shape with a truncated end.

A generally radial end plate connects the burner shell to the intermediate shell at the second end such that a peripheral opening is formed between the outer shell and the intermediate shell such that flow communication is established between the transition cavity and the outer annular region, the end plate having at least one clean soil opening establishing flow communication between the inner annular region and the transition cavity. The at least one clean soil opening is spaced adjacent to the burner shell. A plurality of clamshell ducts are connected to the end plate and extend longitudinally through the inner annular region, generally coextensive with the burner tube. Each of the plurality of clamshell ducts has a respective clean vapor opening establishing flow communication between each of the plurality of clamshell ducts and the transition cavity. Each of the plurality of clamshell ducts terminate at a respective inner end. A reversing duct interconnects the inner ends of the plurality of clamshell ducts with the inner end of the burner shell such that flow communication is established thereamong.

A shroud is spaced within the transition cavity. The shroud has an inner end thereof connected to the end plate between the at least one clean soil opening and the clean vapor openings. The shroud is configured to direct vapor, flowing from the inner annular region into the transition cavity, toward the peripheral opening between the transition cavity and the outer annular region.

A burner tube extends through the truncated end and into the combustion chamber. A vapor return duct, connected to the end plate and encircling the burner tube, forms a first throat between the vapor return duct and the burner tube. The vapor return duct has a flared distal end spaced near the truncated end such that a second throat is formed between the distal end and the truncated end. An air duct encircles the burner tube such that a third throat is formed between the air duct and the burner tube. The air duct is displaceable along the burner tube to operably adjust the first throat. The apparatus includes a blower that operably moves a substantial volume of fluid at substantial velocity through the burner tube.

Sealed auger means operatively feeds contaminated soil into the tumbling region at the first end of the rotary drum. Soil discharge means discharge the remediated soil from the annular region at the first end; vapor discharge means discharge clean vapor from the annular region at the first end. The apparatus is adapted to operatively remediate contaminated soil and oxidize contaminates with a single burner, and to subsequently transfer heat from the remediate soil to incoming contaminated soil whereby the clean, remediated soil and the clean, oxidized contaminates are exhausted at a temperature of approximately 450° F.

The improved soil remediation system also provides a method for reducing energy consumption during remediation of soil contaminated with short-chain hydrocarbons, long-chain hydrocarbons, and/or PCB's. The method comprises the steps of providing an apparatus that includes an inclined rotary drum having a reactor end and an input/output end elevated relative to said reactor end, a first heat exchanging region having a first inner region and a first outer region surrounding and separated from the first inner region, a second heat exchanging region having a second inner region and a second outer region surrounding and separated from the second inner region, burner means adapted to remediate the contaminated soil by operatively and sufficiently elevating the temperature of the contaminated soil contained in the first inner region and the second inner region to vaporize and oxidize the short-chain hydrocarbons, the long-chain hydrocarbons, and/or the PCB's contained in the soil, sealed feeding means for introducing the contaminated soil into the apparatus, and auger means for conveying the soil that has been remediated by the apparatus through the second outer region and the first outer region in counter-flow relation to contaminated soil being gravitationally urged through the first inner region and the second inner region. The method further comprises introducing the contaminated soil into the first inner region near the input/output end by the sealed feeding means, rotating the inclined rotary drum to operatively and gravitationally urge the soil from the input/output end to the reactor end through the first inner region and the second inner region, operating the burner means to remediate the soil by operatively and sufficiently elevating the temperature of the soil contained in the first inner region and the second inner region to vaporize and oxidize the short-chain hydrocarbons, the long-chain hydrocarbons, and/or the PCB's contained in the soil introduced into the first inner region by the sealed feeding means, transferring the remediated soil and the oxidized short-chain hydrocarbons, long-chain hydrocarbons, and/or PCB's vaporized from the soil to the second outer region at the reactor end of the rotary drum, conveying and urging the remediated soil through the second outer region and the first outer region by the auger means and the oxidized short-chain hydrocarbons, long-chain hydrocarbons, and/or PCB's vaporized from the soil to operatively transfer thermal energy from the remediated soil contained in the second outer region and the first outer region to the soil being gravitationally urged through the first inner region and the second inner region, to substantially reduce the temperature of the remediated soil prior to discharge of the remediated soil from the apparatus, and to discharge the remediated soil from the apparatus.

The method further includes reducing the temperature of the remediated soil prior to discharge thereof such that the discharged clean soil and the exhausted clean vapor has a temperature of approximately 450° F.

PRINCIPAL OBJECTS AND ADVANTAGES OF THE INVENTION

The principal objects and advantages of the present invention include: providing an apparatus and method for soil remediation wherein only one burner is required; providing such an apparatus and method that substantially reduces energy requirements without reducing the rate at which contaminated soil is being remediated; providing such an apparatus and method wherein only one rotary drum is required; providing such an apparatus and method wherein only one heat source is required; providing such an apparatus and method wherein thermal energy contained in the soil after remediation and the oxidized contaminates vaporized from the contaminated soil are used to sufficiently heat the soil before remediation to vaporize short-chain hydrocarbons therein; providing such an apparatus and method wherein clean, oxidized vapor from contaminated soil is used to urge remediated soil in counter-flow, heat-transferring relation with gravitationally urged contaminated soil; and generally providing such an apparatus and method that are reliable in performance, and are particularly well adapted for the proposed usages thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
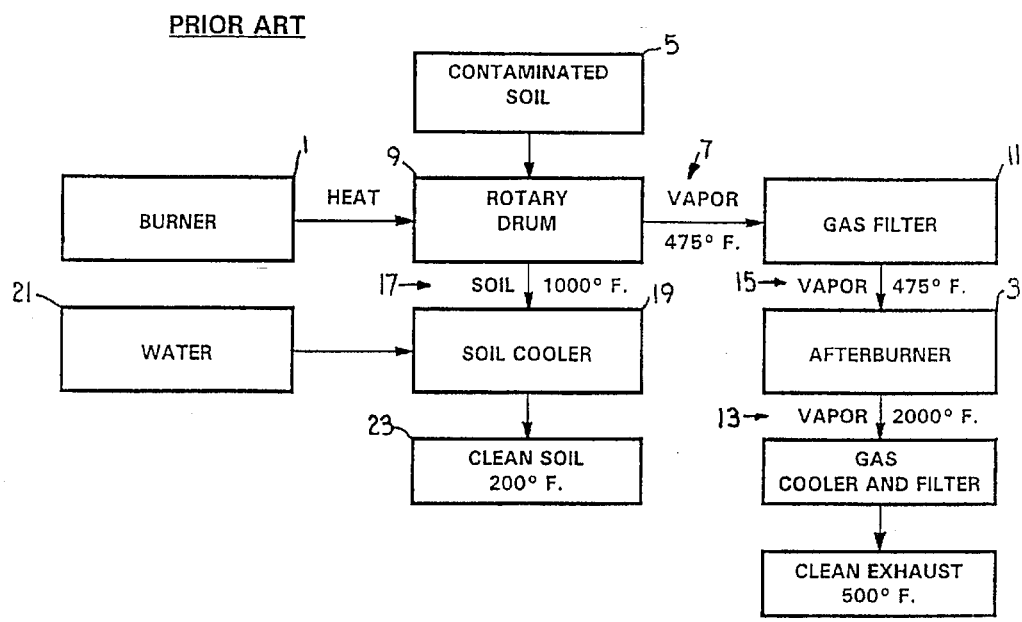
FIG. 1 is a schematic diagram of a prior art soil remediation system.

A description of the process flow of a prior art soil remediation plant, as schematically shown in FIG. 1, can be briefly described as follows. Assume a vaporizing burner 1 and an afterburner 3 of the prior art plant is operated with 25% excess air to remediate contaminated soil 5 containing about 10% moisture at the rate of forty tons per hour. For such a prior art example, the vaporizing burner 1 typically consumes fuel at the rate of approximately 47.4 million BTU's per hour amd the afterburner 3 typically consumes fuel at the rate of approximately 55.9 million BTU's per hour, for a total consumption in excess of approximately 110 million BTU's per hour at a current annual cost on the order of approximately $750,000 per year fuel cost. In addition to the excessive fuel costs of such a prior art soil remediation plant, physical size of and emissions from the plant are directly related to the size of the burners 1 and 3 and of the fuel flow requirements of the burners 1 and 3.

Further, as vapor 7 evaporated in a rotary drum 9 by the burner 1 contains contaminates, the vapor 7 is generally processed through a filter 11 before the vapor 7 is directed to the afterburner 3. As equipment normally used for the filter 11 cannot withstand a temperature of 1000° F., the rotary drum 9 of the exemplary prior art soil remediation system is generally operated in counterflow fashion in order to cool the vapor 7 down to approximately 475° F. by interaction with the contaminated soil 5 in the rotary drum 9. As a result, the contaminated vapor 7 is, in essence, cooled down from approximately 1000° F. before introduction into the filter 11 only to be re-heated up to approximately 2000° F. afterward in the afterburner 3 to provide a vapor 13 that is free from both short-chain and long-chain hydrocarbons, which represents an obvious waste of energy.

Another approach to reclaim some of the otherwise wasted energy has been to pre-heat pre-afterburner vapor 15 with the post-afterburner vapor 13 by use of an air-to-air heat exchanger, such as a heat exchanger having ceramic surfaces. By pre-heating the pre-afterburner vapor 15, such as to approximately 1500° F., by interaction with the post-afterburner vapor 13, some energy savings would, indeed, be realized. Unfortunately, this approach ignores, and is incapable of, recouping any of the thermal energy stored in the cleaned or remediated soil 17 as it exits from the rotary drum 9 at a temperature of approximately 1000° F. Instead, the soil 17 is processed through a cooler 19 wherein water 21 is sprayed on clean soil 17, 23 passing therethrough for cooling purposes. The magnitude of nonrecovered thermal energy represented by the elevated temperate of the soil 17 is on the order of approximately one million BTU per ton per hour, or approximately forty million BTU's per hour of wasted thermal energy for the forty-ton/hour plant.

Figure 2:
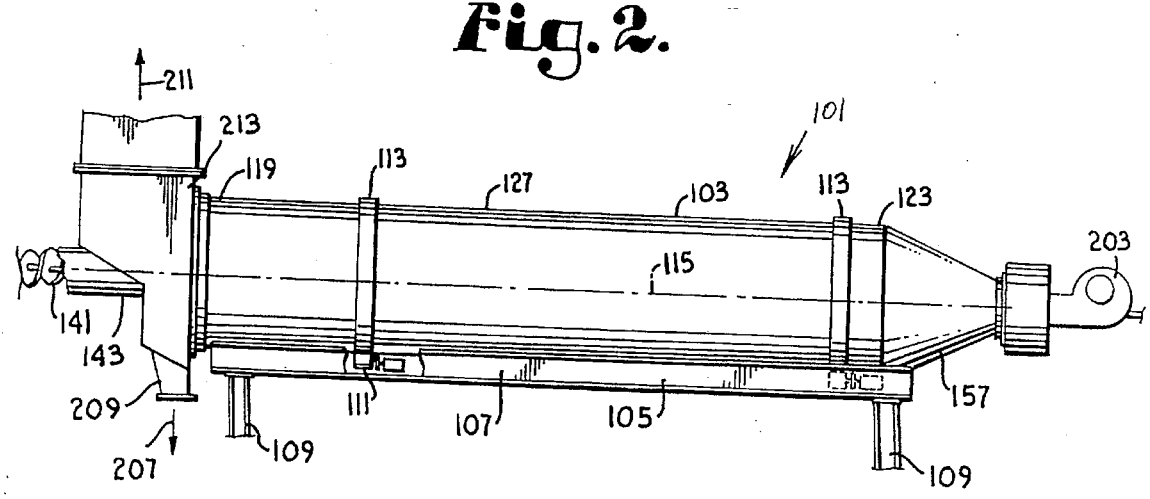
FIG. 2 is a side elevational view of an energy recuperative soil remediation system, according to the present invention.

The reference numeral 101 generally refers to an energy recuperative soil remediation system in accordance with the present invention, as shown in FIGS. 2 through 8. The system 101 generally includes a cylindrically shaped, heat exchanger or rotary drum 103 supported on frame means 105. The frame means 105 generally comprises a pair of spaced apart, parallel beams 107, inclined from a horizontal orientation and supported by vertical legs 109. Mounted on the parallel beams 107 are a plurality of motor driven rollers 111 that supportingly receive trunnion rings 113 secured to the exterior surface of the rotary drum 103, as shown in FIG. 2. Rotation of the drive rollers 111, as engaged with the trunnion rings 113, causes the rotary drum 103 to be rotated about an axis, as designated by numeral 115 in FIG. 2.

The rotary drum 103 has a first-stage or preliminary heat transferring zone 117 extending interiorly inwardly from a first or input/output end 119 of the rotary drum 103 along the longitudinal axis 115 thereof, and a second-stage or reactor heat transferring zone 121 extending from adjacent to the first-stage heat transferring zone 117 to a second or reactor end 123 of the rotary drum 103.

Substantially throughout the first-stage heat transferring zone 117, the rotary drum 103 has a double shell structure 125 with an outer shell 127 and an inner shell 129, that has a tumbling region 131 situated interiorly of the inner shell 129 and an annular region 133 situated between the outer shell 127 and the inner shell 129.

Figure 4:
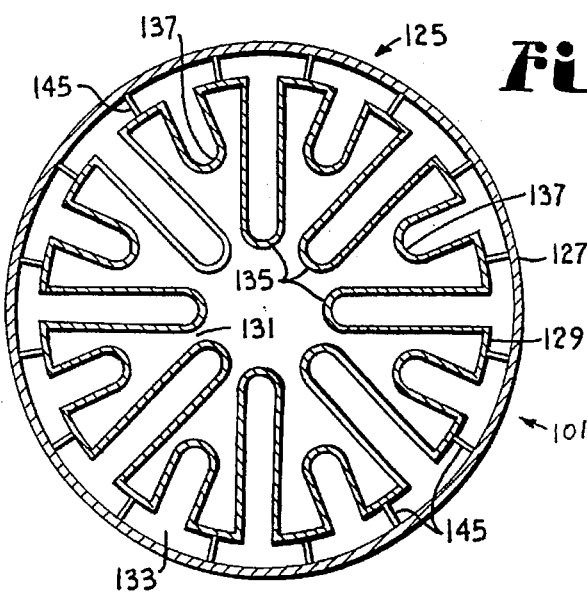
FIG. 4 is an enlarged cross-sectional view of the energy recuperative soil remediation system, taken along line 4—4 of FIG. 3.

The inner shell 129 is longitudinally configured to substantially increase, and perhaps maximize, the surface area that the inner shell 129 provides between the tumbling region 131 and the annular region 133. The configuration of the inner shell 129, as shown in FIG. 4, depicts eight deep longitudinal ribs 135 and eight shallow longitudinal ribs 137 interposed therebetween. It is to be understood that more or fewer in number of the longitudinal ribs 135 and 137 may be required for a particular application. In addition, some applications may require that the longitudinal ribs 135 and 137 be substantially similar as opposed to having both the deep longitudinal ribs 135 and the shallow longitudinal ribs 137. It is to be further understood that, within the nature and spirit of the present invention, the inner shell 129 may be configured with a multitude of other profiles rather than that shown in FIG. 4.

Figure 3:
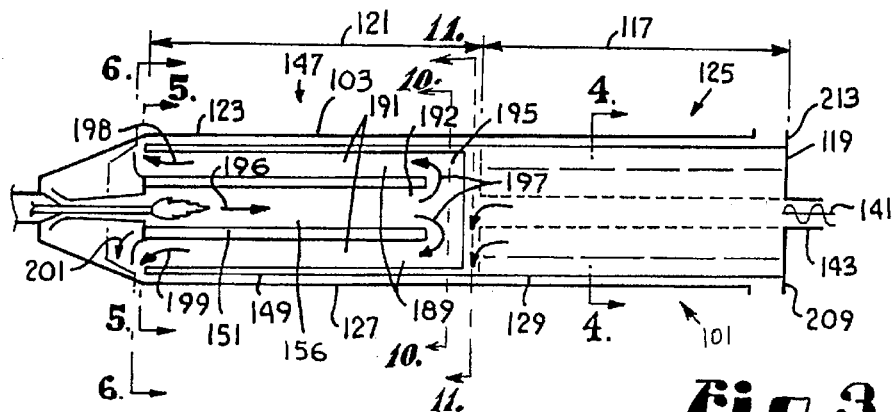
FIG. 3 is a schematic cross-sectional view of the energy recuperative soil remediation system.

The longitudinal axis 115, about which the rotary drum 103 is rotated, is inclined such that the input/output end 119 is elevated above the reactor end 123. The rotary drum 103 is sufficiently inclined whereby contaminated soil 139 deposited into the input/output end 119 of the rotary drum 103, such as by an auger 141 through a sleeve extension or input port 143 spaced centrally along the axis 115, as shown in FIGS. 2 and 3, is gravitationally urged from the input/ output end 119 toward the reactor end 123 of the rotary drum 103. The auger 141 independently rotates inside of the sleeve extension 143 such that a positive pressure seal is operatively provided between the auger 141 and the sleeve extension 143.

Attached to the outer shell 127 in the first-stage heat transferring region 117 are a plurality of spacers 145 that are dimensioned to maintain the spacing of the inner shell 129 relative to the outer shell 127. The spacers 145, which are shown schematically in FIG. 4, have an auger-like configuration in order to urge soil 166 contained in the annular region 133 toward the input/output end 119, counter to the gravitationally urged, direction of travel of the contaminated soil 139 contained in the tumbling region 131.

Figure 7:
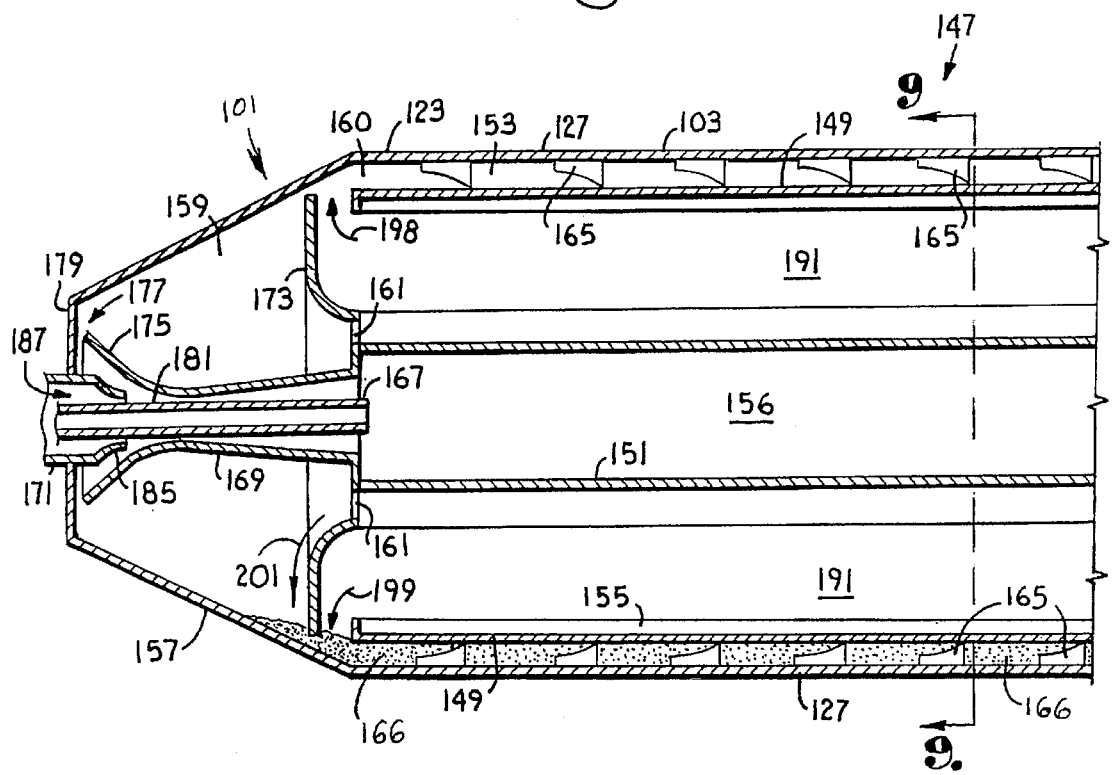
FIG. 7 is an enlarged and fragmentary, longitudinal cross-sectional view of the energy recuperative soil remediation system, according to the present invention.
Figure 8:
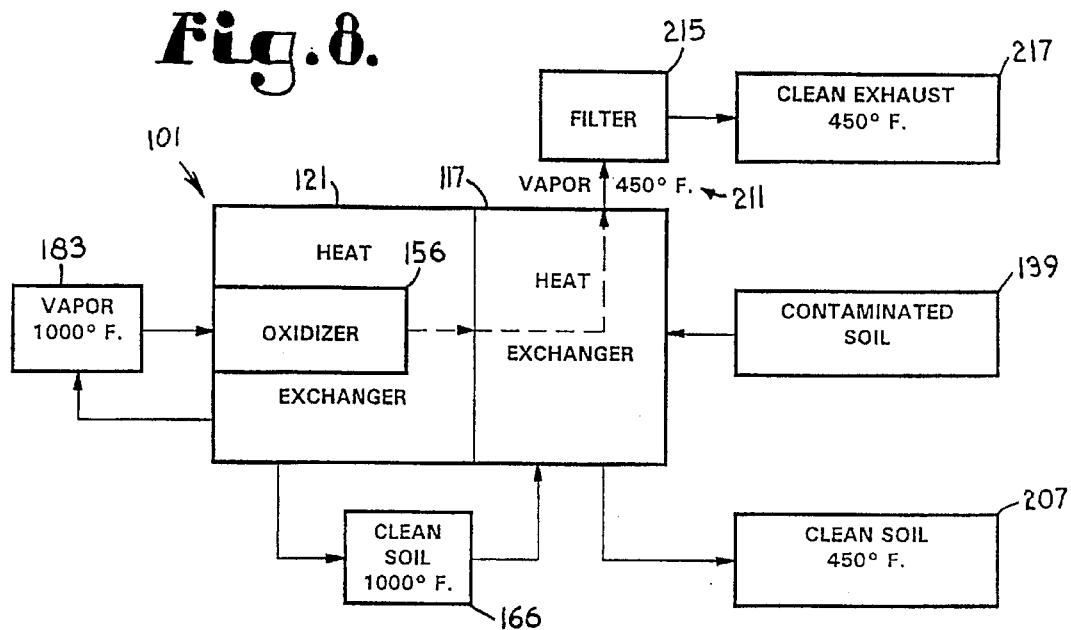
FIG. 8 is a schematic diagram of the energy recuperative soil remediation system, according to the present invention.

Substantially throughout the second-stage heat transferring zone 121, the rotary drum 103 has a triple shell structure 147: the outer shell 127, an intermediate shell 149, and a combustion chamber shell 15 1, as shown in FIG. 7, such that an outer annular region 153 is situated between the outer shell 127 and the intermediate shell 149, an inner annular region 155 is situated between the intermediate shell 149 and the combustion chamber shell 15 1, and a combustion chamber or oxidizer 156 is situated interiorly to the combustion chamber shell 151. The annular region 133 of the first-stage heat transferring zone 117 opens directly into the outer annular region 153 of the second-stage heat transferring zone 121, and the tumbling region 131 of the first-stage heat transferring zone 117 opens directly into the inner annular region 155 of the second-stage heat transferring zone 121.

Figure 5:
FIG. 5 is another enlarged cross-sectional view of the energy recuperative soil remediation system, taken along line 5—5 of FIG. 3.
Figure 6:
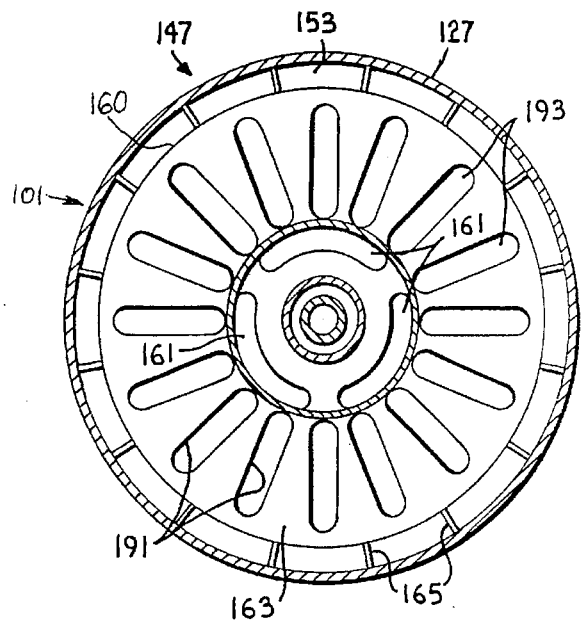
FIG. 6 is still another enlarged cross-sectional view of the energy recuperative soil remediation system, taken along line 6—6 of FIG. 3.
Figure 6:
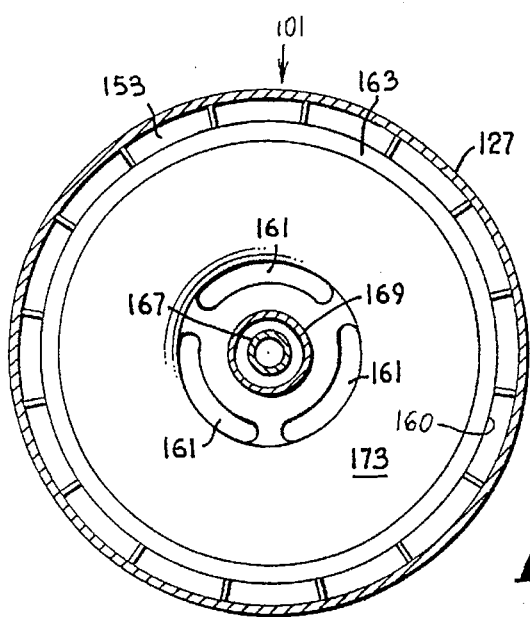

Attached to the reactor end 123 of the rotary drum 103 is a transition component 157, which is generally configured in the shape of a truncated cone having a transition cavity 159 therein, as shown in cross-section in FIG. 7. The outer annular region 153 opens directly into the transition cavity 159 through a peripheral opening 160. Except for one or more openings 161 spaced adjacent to the combustion chamber shell 15 1, the inner annular region 155 is closed off from the transition cavity 159 by an end plate 163, as shown in FIG. 5.

Attached to the outer shell 127 in the second-stage heat transferring region 121 are a plurality of spacers 165 that are dimensioned to maintain the spacing of the intermediate shell 149 relative to the outer shell 127. The spacers 165, which are shown schematically in FIG. 5, have an auger-like configuration in order to urge clean soil 166 contained in the outer annular region 153 from the second-stage heat transferring region 121 to the first-stage heat transferring region 117, counter to the gravitationally urged direction of travel of the contaminated soil 139 traveling through the inner annular region 155.

Spaced, at least partially, within the transition cavity 159 are a generally cylindrical burner tube 167, a generally cylindrical vapor return duct 169 that surrounds and is generally coaxial with the burner tube 167, a generally cylindrical fresh air duct 171 that also surrounds and is generally coaxial with the burner tube 167, and a clean vapor shroud 173 that is also generally coaxial with the burner tube 167.

The vapor return duct 169 has a flare 175 forming an outer throat 177 in the transition cavity 159 near a truncated end 179 of the transition component 157 and an inner throat 181 alongside the burner tube 167 such that contaminated vapor contained in the transition cavity 159 can be drawn into the oxidizer 156 as hereinafter described.

The fresh air duct 171 has a flange 185 that forms a throat 187 alongside the burner tube 167 to provide outside, combustion air that can be forced or drawn into the oxidizer 156. The flange 185 is configured, relative to the vapor return duct 169, whereby the effective cross-sectional area of the inner throat 181 can be decreased by axially displacing the fresh air duct 171 toward the vapor return duct 169 and decreased by axially displacing the fresh air duct 171 away from the vapor return duct 169. Thus, the mixture ratio of fresh air forced or drawn through the throat 187 to the contaminated vapor being drawn through the inner throat 181 can be selectively adjusted as desired.

Inner ends 189 of a plurality of hollow clamshell ducts 191 extend from an inner end 192 of the burner tube 167 to the end plate 163. Each of the clamshell ducts 191 flow communicate with the transition cavity 159 through a respective clamshell opening 193 through the end plate 163, as shown in FIG. 5. Each of the inner ends 189 are connected in flow communication with each other and with the inner end 192 by a reversing duct 195 such that fluid flowing axially inwardly through the burner tube 167, as indicated by the arrow designated by the numeral 196 in FIG. 3, and through the inner end 192 must reverse and flow in the opposite direction through the clamshell ducts 191, as indicated by the arrows designated by the numeral 197 in FIG. 3, and into the transition cavity 159 through the clamshell openings 193.

Figure 9:
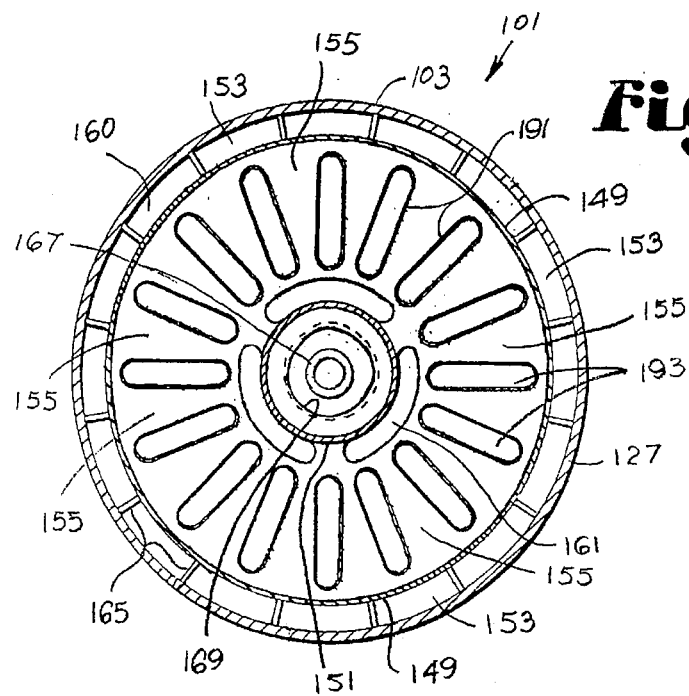
FIG. 9 is another enlarged cross-sectional view of the energy recuperative soil remediation system, taken along line 9—9 of FIG. 7.
Figure 10:
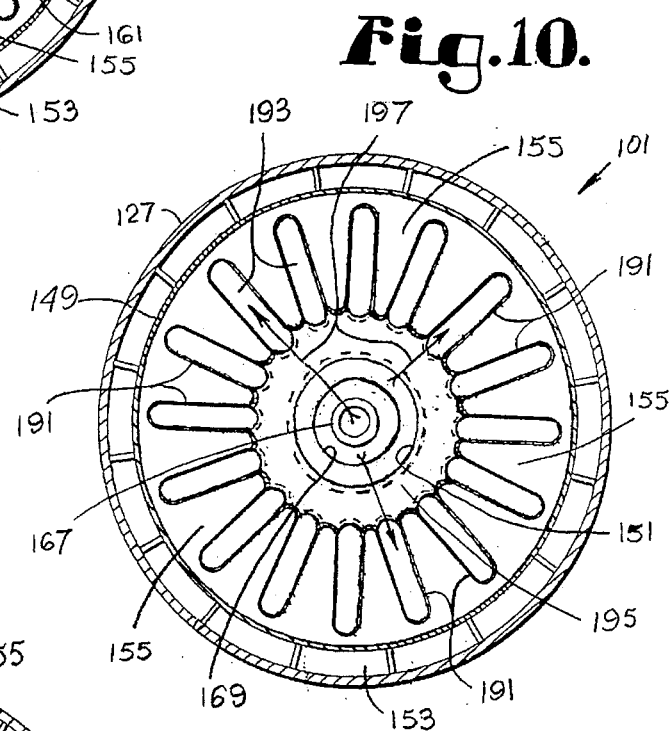
FIG. 10 is another enlarged cross-sectional view of the energy recuperative soil remediation system, taken along line 10—10 of FIG. 3.
Figure 11:
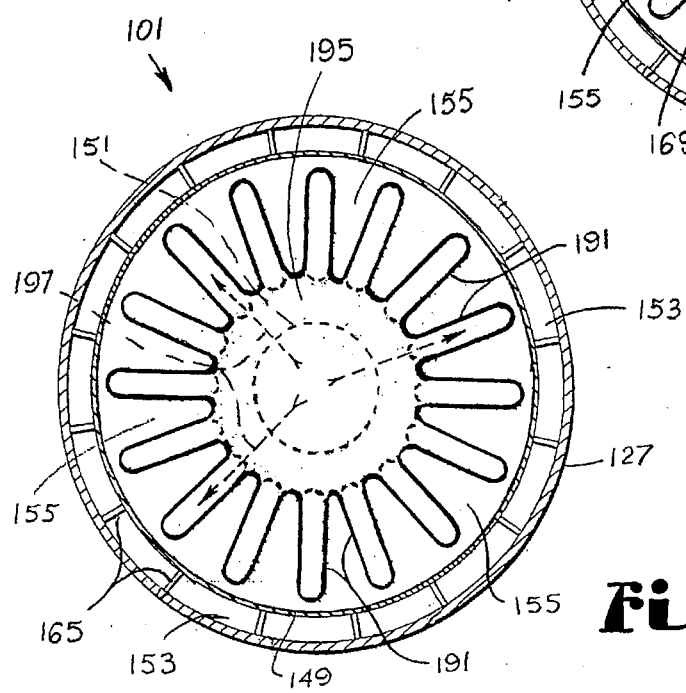
FIG. 11 is another enlarged cross-sectional view of the energy recuperative soil remediation system, taken along line 11—11 of FIG. 3.

A cross-sectional view taken along line 9—9 of FIG. 7 generally centrally through the second-stage heat exchanging zone 121 is shown in FIG. 9. Also, a cross-sectional view taken along line 10—10 of FIG. 3 through the, reversing duct 195 is shown in FIG. 10. Further, a cross-sectional view taken along line 11—11 of FIG. 3 between the reversing duct 195 and the first-stage heat exchanging zone 117 is shown in FIG. 11.

The configuration of the system 101, as shown in FIG. 5, depicts sixteen of the clamshell ducts 191. It is to be understood that more or fewer in number of the clamshell ducts 191 may be required for a particular application. In addition, some applications may require that the clamshell ducts 191 have a shape different from the elongated cross-sectional configuration shown in FIG. 5.

The clean vapor shroud 173 is profiled to direct clean vapor exiting from the oxidizer 156 through the clamshell openings 193 into the transition cavity 159, as indicated by the arrows designated by the numerals 198 and 199 in FIG. 3, toward the peripheral opening 160 between the transition cavity 159 and the outer annular region 153. Preferably, the burner 167 is of the jet type in order to move large volumes of combustion products at relatively high velocity through the openings 193.

In an application of the present invention, pre-screened contaminated soil 139 is axially forced into the first-stage heat transferring zone 117 near the input/output end 119 by the auger 141. As the contaminated soil 139 drops into the first-stage heat transferring zone 117, it is subjected to temperatures on the order of 200° F. or more by heat transfer through the inner shell 129 from clean soil 166 being displaced through the annular region 133 toward the input/ out end 119, as hereinafter described.

As the contaminated soil 139 is gravitationally urged toward the second-state heat transferring zone 121 by the tumbling action of the inclined rotary drum 103, the temperature of the contaminated soil 139 is progressively elevated due to heat transfer predominantly by conduction from the clean soil 166 through contact of the contaminated soil 139 with the inner shell 129. As the contaminated soil 139 passes from the first-stage heat transferring zone 117 into the second-stage heat transferring zone 121, the contaminated soil 139 has reached a temperature of approximately 400°–500° F. such that substantially all moisture in the contaminated soil 139 has been convened into steam and most of the short-chain hydrocarbons contained in the contaminated soil 139 have been vaporized.

As the contaminated soil 139 continues to be gravitationally urged through the second-stage heat transferring zone 121 toward the reactor end 123 by the tumbling action of the inclined rotary drum 103, the temperature of the contaminated soil 139 is further progressively elevated due to heat transfer by radiation from the intermediate shell 149, the combustion chamber shell 151, and the clamshell ducts 191; and by conduction through contact of the contaminated soil 139 with the intermediate shell 149, the combustion chamber shell 151, and the clamshell ducts 191.

As the contaminated soil 139 progresses through the second-stage heat transferring zone 121, the contaminated soil 139 and the accompanying steam and short-chain hydrocarbons are further heated to approximately 1000° F., which results in long-chain hydrocarbons and/or PCB's contained in the contaminated soil 139 also being vaporized. The steam and vaporized hydrocarbons and PCB's, having been released from the contaminated soil 139, readily pass through the openings 161 into the transition cavity 159.

Due to the radially inwardly spacing of the openings 161 from the intermediate shell 149, the soil 139 ramps backwardly into the second-stage heat transferring zone 121 from the end plate 163 until the depth of the ramped contaminated soil 139 abutting the end plate 163 reaches the openings 161, whereupon the previously contaminated soil 139—now clean soil 166—spills into the transition cavity 159 and falls downwardly against the cortically shaped transition component 157, as indicated by the arrow designated by the numeral 201 in FIGS. 3 and 7.

Due to the conical configuration of the transition component 157 and the rotary motion thereof, the clean soil 166 is gravitationally urged back toward the peripheral opening 160 into the outer annular region 153 between the intermediate shell 149 and the outer shell 127.

The residence time of the contaminated soil 139 in the second-stage heat transferring region 121 and the temperature at which the clean soil 166 exits the second-stage heat transferring region 121 can be controlled by selectively altering a variety of variables, including the rate of rotation of the rotary drum 103, the magnitude of the radial displacement of the openings 161 from the intermediate shell 149, the degree of incline of the rotary drum 103 from a horizontal orientation, and the burn rate of the burner 167.

The steam and vaporized hydrocarbons and PCB's which exit from the inner annular region 155 into the transition cavity 159 through the openings 161 are drawn into the oxidizer 156 through the outer and inner throats 177 and 181 to be heated to approximately 2000° F. and oxidized by the burner 167 in a stream of hot gases. The inner throat 181 can be regulated as desired by axially adjusting the fresh air duct 171 relative to the vapor return duct 169 in order to provide appropriate outside air for combustion of the hydrocarbons and PCB's in the oxidizer 156. As a substantial quantity of steam and vapors must be jet pump drawn into the burner 167, a high pressure double-stage combustion air blower 203 may be required for some applications.

Hot combustion products, from the burner 167 and from oxidizing the hydrocarbons and PCB's oxidized in the oxidizer 156 travel through the oxidizer 156, as the stream of hot gases, in a direction counter to the direction in which the contaminated soil 139 travels through the inner annular region 155. As the stream of hot gases comprising hot combustion products and oxidized contaminates 196 reach the reversing duct 195, they are deflected back into the clamshell ducts 191. The stream of hot gases comprising hot combustion products and oxidized contaminates—now clean vapor 198, 199—enter the clamshell ducts 191 at a temperature of approximately 2000° F. and, while transversing the clamshell ducts 191, are cooled to approximately 1100° F. due to heat transfer to the contaminated soil 139 through the clamshell ducts 191.

Upon exiting from the openings 161 in the end plate 163, the clean vapor 198, 199 is directed by the clean vapor shroud 173 toward the peripheral opening 160 between the transition cavity 159 and the outer annular region 153. By so directing the clean vapor 198, 199, a portion of the clean vapor 198, 199 flushes the contaminated vapor away from the peripheral opening 160 to thereby prevent recontamination of the clean soil 166 contained in the outer annular region 153 and the annular region 133. Also, a portion of the clean vapor 198, 199, entering the clean soil 166 between the clean vapor shroud 173 and the end plate 163, passes under the clean vapor shroud 173 and flushes out the contaminated vapor that may have been swept along with the clean soil 166 as it fell through the transition cavity 159 from the openings 161 to the inner conical surface of the transition component 157, as hereinbefore described.

The remaining portions of the clean vapor 198 and 199 join with the clean soil 166 to enter the outer annular region 153. The auger-configuration of the spacers 165, aided by the high-gas-velocity fluidization of remaining portions of the clean vapor 198 and 199 urges the clean soil 166 up the incline of the rotary drum 103. As the clean soil 166 is urged through the second-stage heat transferring zone 121, the clean soil 166 may undergo some cooling as heat is transferred through the intermediate shell 149 from the clean soil 166 and the clean oxidized vapor to the contaminated soil 139 moving in the opposite direction through the inner annular region 155.

As the clean soil 166 passes from the outer annular region 153 of the second-stage heat transferring region 121 into the annular region 133 of the first-stage heat transferring region 117, the auger-configuration of the spacers 145, assisted by the remaining portions of the clean vapor 198 and 199, continue to urge the clean soil 166 up the incline of the rotary drum 103 toward the input/output end 119. As the clean soil 166 is urged through the first-stage heat transferring zone 117, the clean soil 166 is cooled as heat is transferred through the inner shell 129 from the clean soil 166 to the contaminated soil 139 moving in the opposite direction through the tumbling region 131.

As the clean soil 166 and the remaining portions of the clean vapor 198 and 199 reach the input/output end 119, they have been cooled to clean soil 207, that exits at a temperature of approximately 450° F. through a clean soil exit port 209, and clean vapor 198, 199, that exits at a temperature of approximately 450° F. through a clean vapor exit port 213, as indicated by the arrow designated by the numeral 211 in FIG. 2. In some applications, it may be desirable that the clean soil 207 and the clean vapor 211 exit through the same exit port.

If additional cooling is needed, the clean soil 207, being at approximately 450° F., requires substantially less water for further cooling than is required to cool clean soil at approximately 1000° F., as normally provided by prior art soil remediation systems. Similarly, the clean vapor 211, also being at approximately 450° F., may require no further cooling before being processed through a filter 215 and released to the atmosphere as clean exhaust 217.

It is to be understood that while certain forms of the present invention have been illustrated and described herein, it is not to be limited to the specific forms or arrangement of parts described and shown.

What is claimed and desired to be secured by Letters Patent is as follows:

1. An apparatus for remediating contaminated soil containing short-chain hydrocarbons, long-chain hydrocarbons and/or PCB 's, the apparatus comprising:

a) a rotary drum having a first end and a second end, said rotary drum further having:

1) first heat transferring means extending axially inwardly from adjacent to said first end to a boundary spaced intermediately between said first end and said second end, said first heat transferring means forming a first heat transferring zone that is operative to transfer thermal energy from remediated soil contained in and being conveyed through a first outer region of said first heat transferring means to contaminated soil contained in a first inner region of said first heat transferring means wherein the contaminated soil is conveyed through said first inner region in counter-flow relation to the remediated soil being conveyed through said first outer region, and 2) second heat transferring means extending axially within said rotary drum from adjacent to said first heat transferring means to adjacent to said second end, said second heat transferring means forming a second heat transferring zone that is operative to transfer thermal energy to contaminated soil contained and being finally remediated in a second inner region of said second heat transferring zone wherein said contaminated soil is being conveyed through said second inner region in counter-flow relation to said remediated soil being conveyed through a second outer region of said heat transferring zone;

b) thermal means for generating sufficient thermal energy to remediate the contaminated soil contained in said second inner region, said thermal means including oxidizing means for oxidizing the short-chain hydrocarbons, long-chain hydrocarbons and PCB's vaporized from the contaminated soil in a stream of hot gases generated by said thermal means; and c) transition means for transferring said soil remediated by said thermal means from said second inner region and for transferring said stream of hot gases to said second outer region.

2. The apparatus according to claim 1, wherein a) said rotary drum is inclined such that said first end is elevated relative to said second end; and including b) conveying means for conveying remediated soil through said first and second outer regions from said second end to said first end of said apparatus.

3. The apparatus according to claim 2, wherein said first heat transferring means includes:

a) an outer shell; and b) an inner shell spaced radially inwardly from said outer shell and being generally co-extensive with said first heat transferring zone such that a tumbling region is contained internally within said inner shell and an annular region is formed between said outer shell and said inner shell.

4. The apparatus according to claim 3, including sealed auger means for operatively feeding contaminated soil into said rambling region at said first end of said rotary drum.

5. The apparatus according to claim 3, including soil discharge means for discharging remediated soil from said annular region at said first end.

6. The apparatus according to claim 3, including vapor discharge means for discharging said stream of hot gases as clean vapor from said annular region at said first end.

7. The apparatus according to claim 3, wherein said second heat transferring means includes said outer shell and further includes:

a) a burner shell spaced radially inwardly from said outer shell and having a combustion chamber internally therein, said burner shell being generally co-extensive with said second heat transferring zone, b) an intermediate shell spaced radially between said outer shell and said burner shell such that an outer annular region is formed between said outer shell and said intermediate shell and an inner annular region is formed between said intermediate shell and said burner shell, said intermediate shell connected to said inner shell such that contaminated soil is gravitationally urged from said inner shell into said intermediate shell; and c) spacers to support said inner shell and said intermediate shell relative to said outer shell.

8. The apparatus according to claim 7, wherein said conveying means includes said spacers having an auger-like configuration to operatively urge the remediated soil through said outer annular region and said annular region from said second end to said first end in counter-flow relation to the contaminated soil being gravitationally urged from said first end to said second end through said first and second heat exchanging zones.

9. The apparatus according to claim 7, wherein said transition means includes:

a) a transition component connected to said second end such that a transition cavity is formed therein; and wherein b) said second heat transferring means includes:

1) a generally radial end plate connecting said burner shell to said intermediate shell at said second end such that a peripheral opening is formed between said outer shell and said intermediate shell wherein flow communication is established between said transition cavity and said outer annular region, said end plate having at least one clean soil opening establishing flow communication between said inner annular region and said transition cavity, said at least one clean soil opening spaced adjacent said burner shell;

2) a plurality of clamshell ducts connected to said end plate and extending longitudinally through said inner annular region and generally coextensive with said burner tube, each of said plurality of clamshell ducts having a respective clean vapor opening establishing flow communication between each of said plurality of clamshell ducts and said transition cavity, each of said plurality of clamshell ducts terminating at a respective inner end; and 3) a reversing duct interconnecting said inner ends of said plurality of clamshell ducts and said inner end of said burner shell such that flow communication is established thereamong.

10. The apparatus according to claim 9, wherein said second heat transferring means is structured such that thermal energy transferred to soil contained in said second inner region of said second heat transferring zone is substantially transferred by radiation and conduction heating from said combustion chamber shell and said clamshell ducts.

11. The apparatus according to claim 10, wherein said stream of hot gases is cooled from approximately 2000° F. to approximately 1100° F. as said stream of hot gases flows through said clamshell ducts from said combustion chamber to said transition cavity.

12. The apparatus according the claim 9, including a shroud spaced within said transition cavity, said shroud having an inner end thereof connected to said end plate between said at least one clean soil opening and said clean vapor openings; said shroud configured to direct said stream of hot gases, flowing from said inner annular region into said transition cavity, toward said peripheral opening between said transition cavity and said outer annular region.

13. The apparatus according to claim 9, wherein said burner means includes a burner tube extending through said transition cavity and into said combustion chamber.

14. The apparatus according to claim 13, wherein said transition component has a generally conical shape with a truncated end and wherein said oxidizing means includes a vapor return duct connected to said end plate and encircling said burner tube such that a first throat is formed between said vapor return duct and said burner tube, said vapor return duct having a flared distal end spaced near said truncated end such that a second throat is formed between said distal end and said truncated end.

15. The apparatus according to claim 14, further including an air duct encircling said burner tube such that a third throat is formed between said air duct and said burner tube, said air duct displaceable along said burner tube to operably adjust said first throat.

16. The apparatus according to claim 1, including a transition component connected to said second end such that a transition cavity is formed therein; said transition component having a generally conical shape with a truncated end.

17. The apparatus according to claim 1, wherein said second heat transferring means includes vapor recirculating means, comprising:
 a) a transition component connected to said second end such that a transition cavity is formed therein; and wherein
 b) said second heat transferring means includes:
  1) a generally radial end plate connecting said burner shell to said intermediate shell at said second end such that a peripheral opening is formed between said outer shell and said intermediate shell wherein flow communication is established between said transition cavity and said outer annular region, said end plate having at least one clean soil opening establishing flow communication between said inner annular region and said transition cavity, said at least one clean soil opening spaced adjacent said burner shell;
  2) a plurality of clamshell ducts connected to said end plate and extending longitudinally through said inner annular region and generally coextensive with said burner tube, each of said plurality of clamshell ducts having a respective clean vapor opening establishing flow communication between each of said plurality of clamshell ducts and said transition cavity, each of said plurality of clamshell ducts terminating at a respective inner end; and
  3) a reversing duct interconnecting said inner ends of said plurality of clamshell ducts and said inner end of said burner shell such that flow communication is established thereamong.

18. The apparatus according to claim 1, wherein said second heat transferring means includes blower means for operably directing a substantial volume of fluid at substantial velocity through said blower tube.

19. The apparatus according to claim 1, wherein said first and second heat transferring means are adapted to discharge said stream of hot gases as clean vapor and the remediated soil from said apparatus at a temperature of approximately 450° F.

20. The apparatus according to claim 1, wherein said burner means comprises a single burner.

21. An apparatus for remediating contaminated soil containing short-chain hydrocarbons, long-chain hydrocarbons and/or PCB's, the apparatus comprising:
 a) a rotary drum having
  1) a first end to operatively receive the contaminated soil to be remediated and discharge the soil after remediation thereof,
  2) a second end, and
  3) internal heat exchanger means for transferring thermal energy to the contaminated soil to be remediated from burner means as provided herebelow and from the remediated soil as the contaminated soil being remediated is conveyed from said first end to said second end through an inner compartment of said heat exchanger means and as the remediated soil is conveyed from said second end to said first end through an outer compartment of said heat exchanger means;
 b) burner means for generating sufficient thermal energy, including a stream of hot gases, within said internal heat exchanger means to remediate the contaminated soil contained in said inner compartment and to oxidize the short-chain hydrocarbons, long-chain hydrocarbons and PCB's released from the soil being remediated; and
 c) transition means for transferring, to said outer compartment from said inner compartment, said stream of hot gases and said soil being remediated after remediation.

22. A method of remediating soil contaminated with short-chain hydrocarbons, long-chain hydrocarbons, and/or PCB's, the method comprising the steps of:
 a) providing an apparatus including an inclined rotary drum having an input/output end and a reactor end wherein said input/output end is elevated relative to said reactor end, said rotary drum further including:
  1) sealed feeding means for introducing the contaminated soil into said apparatus,
  2) a first heat exchanging region having a first inner region and a first outer region wherein said first outer region surrounds and is separated from said first inner region,
  3) a second heat exchanging region having a second inner region and a second outer region wherein said second outer region surrounds and is separated from said second inner region,
  4) burner means to remediate the soil by operatively and sufficiently elevating the temperature of the soil contained in said first inner region and said second inner region to vaporize and oxidize the short-chain hydrocarbons, the long-chain hydrocarbons, and/or the PCB's, and 5) auger means for conveying the soil that has been remediated by said apparatus through said second outer region and said first outer region in counterflow relation to contaminated soil being gravitationally urged through said first inner region and said second inner region;

b) introducing the contaminated soil into said first inner region near said input/output end by said sealed feeding means;

c) rotating said inclined rotary drum to operatively and gravitationally urge the soil from said input/output end to said reactor end through said first inner region and said second inner region;

d) generating a stream of hot gases with said burner means to remediate the soil by operatively and sufficiently elevating the temperature of the soil contained in said first inner region and said second inner region to vaporize and oxidize the short-chain hydrocarbons, the long-chain hydrocarbons, and/or the PCB's, contained in the soil introduced into said first inner region by said sealed feeding means;

e) transferring the remediated soil and the stream of hot gases to said second outer region at said reactor end of said rotary drum; conveying and urging the remediated soil through said second outer region and said first outer region by said auger means and said stream of hot gases:
 1) to operatively transfer thermal energy from the remediated soil and the stream of hot gases contained in said second outer region and said first outer region to the soil being gravitationally urged through said first inner region and said second inner region,
 2) to substantially reduce the temperature of the remediated soil and the stream of hot gases prior to discharge thereof from said apparatus, and
 3) to discharge the remediated soil and the stream of hot gases from said apparatus.

23. The method according to claim 22, the remediated soil and the stream of hot gases, without water cooling, are discharged from said apparatus at a temperature of approximately 450° F.

* * * * *